(12) United States Patent
Achar et al.

(10) Patent No.: US 10,706,720 B2
(45) Date of Patent: Jul. 7, 2020

(54) PREDICTING VEHICLE TRAVEL TIMES BY MODELING HETEROGENEOUS INFLUENCES BETWEEN ARTERIAL ROADS

(71) Applicant: Tata Consultancy Services Limited, Mumbai (IN)

(72) Inventors: Avinash Achar, Chennai (IN); Venkatesh Sarangan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 241 days.

(21) Appl. No.: 15/897,894

(22) Filed: Feb. 15, 2018

(65) Prior Publication Data

US 2019/0088116 A1 Mar. 21, 2019

(30) Foreign Application Priority Data

Sep. 16, 2017 (IN) .............................. 201721032847

(51) Int. Cl.
*G06N 7/00* (2006.01)
*G08G 1/01* (2006.01)

(52) U.S. Cl.
CPC ........... *G08G 1/0129* (2013.01); *G06N 7/005* (2013.01); *G08G 1/0112* (2013.01); *G08G 1/0141* (2013.01)

(58) Field of Classification Search
None
See application file for complete search history.

(56) References Cited

U.S. PATENT DOCUMENTS 8,718,925 B2 5/2014 Letchner et al.
9,459,107 B2 10/2016 Payne et al.
(Continued)

OTHER PUBLICATIONS

Heckerman, David, and John S. Breese, "A new look at causal independence." Uncertainty Proceedings, 1994, Morgan Kaufmann, 1994. 286-292.*

(Continued)

*Primary Examiner* — Thomas G Black
*Assistant Examiner* — Ana D Thomas
(74) *Attorney, Agent, or Firm* — Finnegan, Henderson, Farabow, Garrett & Dunner LLP (57) ABSTRACT

A system and method for predicting travel time of a vehicle on one or more routes within arterial roads. It collects historical information from probe vehicles positions using GPS technology in a periodic fashion and the sequence of links traversed between successive position measurements. Further, it collects information of neighborhood structure for each link within the arterial roads network. A NoisyOR conditional probability distribution function is proposed to capture the spatio-temporal dependencies between each link of the arterial network and its neighbors. It learns the parameters of this data driven probabilistic model from collected historical information of probe vehicle trajectories traversed within the arterial roads network using a proposed expectation maximization method. Finally it predicts travel time of vehicles on routes within the arterial roads using the learnt parameters and real time information of trajectories of vehicle that have been recorded from the arterial roads network using GPS technology sensing.

15 Claims, 8 Drawing Sheets

(56) References Cited

U.S. PATENT DOCUMENTS

2009/0043486 A1   2/2009   Yang et al.
2016/0018237 A1   1/2016   Rosario et al.

OTHER PUBLICATIONS

Hofleitner, Aude, Ryan Herring, and Alexandre Bayen, "Arterial travel time forecast with streaming data: A hybrid approach of flow modeling and machine learning.", Transportation Research Part B: Methodological 46.9 (2012): 1097-1122.*

* cited by examiner

PREDICTING VEHICLE TRAVEL TIMES BY MODELING HETEROGENEOUS INFLUENCES BETWEEN ARTERIAL ROADS

PRIORITY CLAIM

This U.S. patent application claims priority under 35 U.S.C. § 119 to India Application No. 201721032847, filed on Sep. 16, 2017. The entire contents of the abovementioned application are incorporated herein by reference.

TECHNICAL FIELD

The embodiments herein generally relates to a system and method for predicting the travel times of vehicles in a network of the arterial roads and, more particularly, predicting vehicle travel times by modelling heterogeneous influences between the arterial roads.

BACKGROUND

Advances in affordable technologies for sensing and communication have allowed humans to gather data about large distributed infrastructures such as road networks in real-time. The collected data is digested to generate information that is useful for the end users (namely commuters) as well as the road network administrators. Most of this effort falls under broad umbrella of short term traffic forecasting. From the commuters' perspective, travel time is perhaps the most useful information. Predicting travel time along various routes in advance with good accuracy allows commuters to plan their trips appropriately by identifying and avoiding congested roads. Travel time estimation helps transport managers too by helping them identify operational problems such as congestion hot-spots, out-of-sync traffic lights and unhelpful lane directions settings.

Crowd-sourcing based applications allow commuters to predict their travel times along multiple routes. While the prediction accuracy of such applications is reasonable in many instances, they may not be helpful for all vehicles. In certain countries, vehicles larger than cars—such as small commercial trucks are restricted to specific lanes with their own different (often lower) speed limit. Hence, the travel times and congestions seen by such vehicles could be different from the (possibly average) values that are predicted from the crowdsourced data. A variety of data driven techniques to predict travel time have also been proposed based on linear regression, time series models, neural networks, and regression trees to name a few. Most of these methods address prediction in a freeway context. This is mainly because freeways are relatively well instrumented with sensors like loop detectors, AVI detectors, and cameras.

On the other hand, urban/arterial roads have been relatively less studied. A possible reason for this could be the complexities involved in handling traffic lights and intersections. Recently, approaches based on dynamic Bayesian networks (DBN) have also been proposed to predict travel time on arterial roads based on sparse probe vehicle data. Under real world traffic conditions, such sophisticated techniques have been shown to significantly outperform other simpler methods.

Existing approaches either capture dependencies in a detailed manner or in an oversimplified fashion. In one of the approaches the modelling assumption leads to a computationally prohibitive number of parameters to be learnt. This method hence suffers from severe over-fitting problems. In another approach (very efficient in the number of parameters), it is assumed that the state of congestion in a given road is influenced equally by the state of congestion of all its neighbors, which can be very restrictive. In reality, different neighbors will exert different degrees of influence on a given road, for instance, the state of a downstream road which receives bulk of the traffic from an upstream road will exert a higher influence on the congestion state of the upstream road than other neighbors.

In order to overcome this difficulty there has been interest in studying an alternative DBN based approach that strikes a balance by modelling the variations in the degrees of influence a given road may experience from its neighbors, while keeping a check on the number of parameters to be learnt.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for predicting travel time of a vehicle on one or more routes within a network of the arterial roads.

In one aspect, a method for predicting travel time of a vehicle on one or more routes within the network of the arterial roads. The method comprising steps of collecting information of one or more probe vehicle positions using GPS technology over a period of time in a periodic fashion and the sequence of links traversed between successive position measurements, wherein the probe vehicles are plying around the arterial roads network. Further, it collects information of neighborhood structure for each link within the arterial roads network, wherein the information of neighborhood structure for the link includes all its downstream and upstream links. It captures the spatio-temporal dependencies between each link of the network and all its neighbors using a NoisyOR conditional probability distribution. In addition, the method includes process of learning of the parameters of a data driven probabilistic model from collected historical information of probe vehicle trajectories traversed within the arterial roads network using expectation maximization method. Finally it predicts the travel time of the vehicle on one or more routes within the arterial roads using the real time information of the vehicle trajectories that have been recorded from the arterial roads network using GPS technology sensing.

In another aspect, a system for predicting travel time of a vehicle on one or more routes within the networks of the arterial roads. The system comprising a memory with set of instructions and a processor which is configured to execute one or more steps of collecting information of one or more probe vehicle positions using GPS technology over a period of time in a periodic fashion and the sequence of links traversed between successive position measurements, wherein the probe vehicles are plying around the arterial roads network. Further the system collects information of neighborhood structure for each link within the arterial roads network, wherein the information of neighborhood structure for the link includes all its downstream and upstream links. It captures the spatio-temporal dependencies between each link of the network and all its neighbors using a NoisyOR conditional probability distribution. In addition, it learns the parameters of a data driven probabilistic model from collected information of probe vehicle trajectories traversed within the arterial roads network using expectation maximization method and thus, the system predicts the travel time of the vehicle on one or more routes within the network of arterial roads using the real time information of the vehicle trajectories that have been recorded from the arterial roads network using GPS technology sensing.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
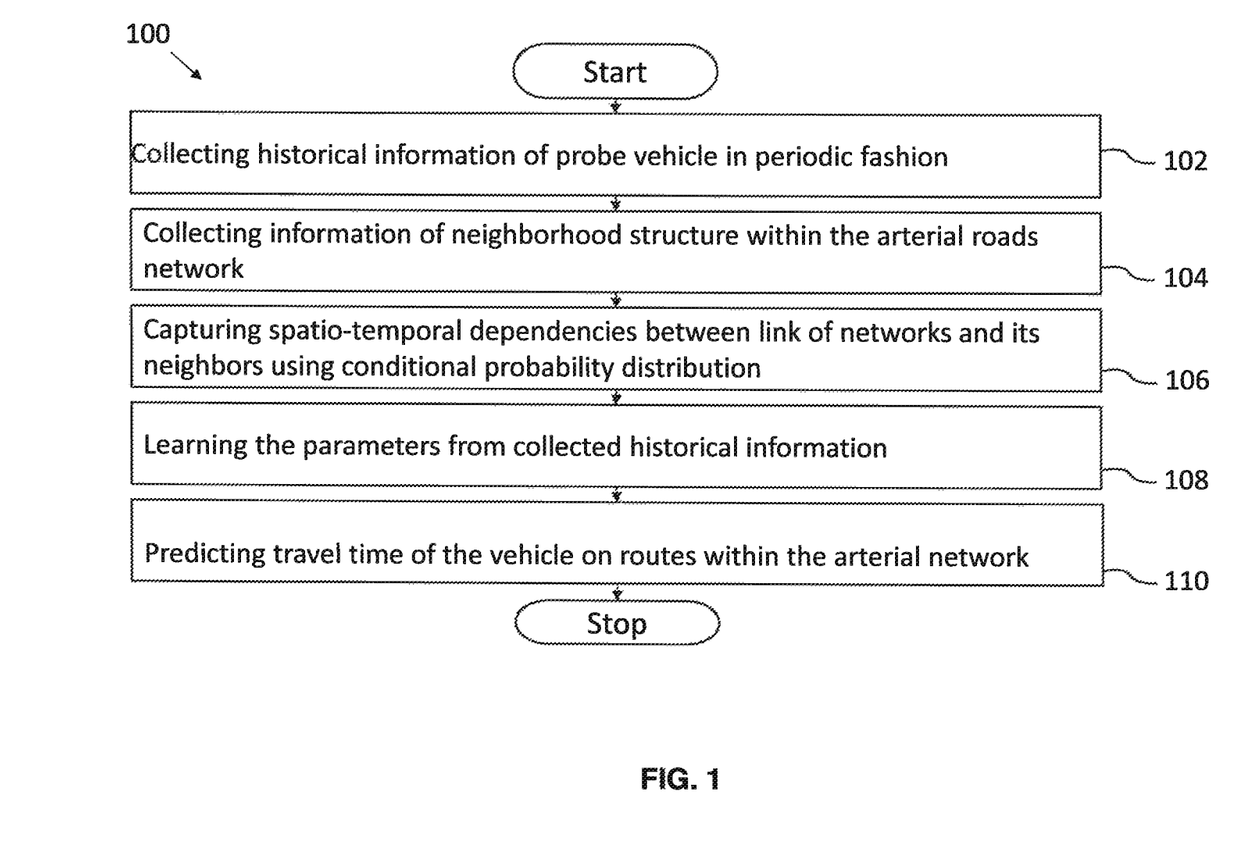
FIG. 1 illustrates a method for predicting travel time of a vehicle on one or more routes within arterial roads according to an embodiment of the present disclosure.

Referring FIG. 1, a method 200 for predicting travel time of a vehicle on one or more routes within a network of arterial roads.

At the step 202, where the process collects information of one or more probe vehicle positions using GPS technology over a period of time in a periodic fashion and the sequence of links traversed between successive positions. It would be appreciated that the collected information of one or more probe vehicle positions over a period of time includes historical information of the one or more probe vehicle trajectories wherein, the probe vehicles are plying around the network of the arterial roads. The one or more probe vehicles are enabled with GPS technology, for instance could be regular cabs from a cab service or a regular commuters with a smart phone based or dedicated GPS sensing. The one or more probe vehicles act as a data source for observing the network's condition. These vehicles are assumed to send their GPS co-ordinates in a periodic fashion.

At the step 204, where the process collects information of neighborhood structure for each link of one or more links of the network of the arterial roads. The collected information of neighborhood structure for the link includes downstream links and upstream links of the route.

At the step 206, where the process captures the spatio-temporal dependencies between each link of the network of the arterial roads and all its neighbors using a NoisyOR conditional probability distribution. It would be appreciated that the arterial traffic is modelled as a discrete-time dynamical system. At each time step, each link of the network is assumed to be in one or two states namely, congested or uncongested.

Figure 2:
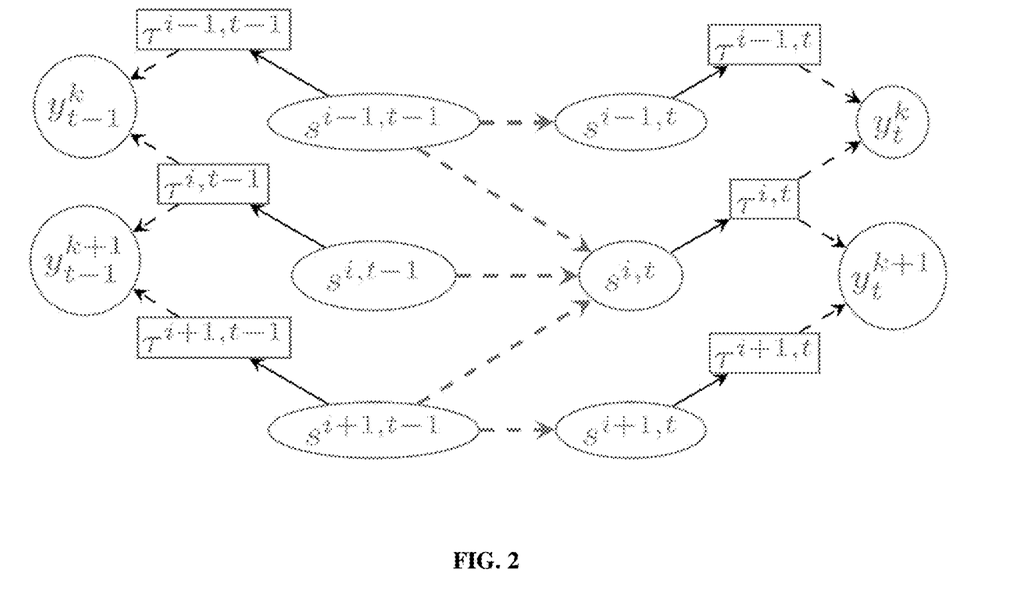
FIG. 2 is a schematic diagram of two time-slice Bayesian net structure according to an embodiment of the present disclosure.

Referring FIG. 2, which shows the structure of the utilized Dynamic Bayesian Network (DBN), wherein at time step t, a link i∈l in the network is assumed to be in one of two states congested (1) and uncongested (0). The set of roads πi are adjacent to the arterial road i including itself. The adjacent structure of the road network is utilized to obtain the transition structure of the DBN from time step t to time t+1. Specifically, the state of link i at time t+1 is assumed to be a function of the state of all its neighbor $\pi_i$ at time t. In the DBN structure, this implies that the node corresponding to the link i at time t+1 will have incoming edge from nodes in $\pi_i$ at time t. The traversal time on a trajectory is a sum of random variables, each representing the travel time of a link of the path. It is to be noted that the travel time on a link to be a random variable whose distribution depends on the state of the respective link. From the structure of DBN given the state information of the underlying links, these link travel times are independent. Hence the conditional travel time on a path is sum of independent random variables.

At the step 208, where the process provides learning of the parameters of a data driven probabilistic model from collected historical information of the trajectories of the one or more probe vehicle traversed within the network of the arterial roads and captured spatio-temporal dependencies between each link of the network of the arterial roads using expectation maximization method. It would be appreciated that the data driven probabilistic model is a Dynamic Bayesian Network (DBN). There are two types of conditional probability distributions (CPD) possible on the DBN namely observation CPD and transition CPD. It is to be noted that noisyOR CPD is used for modelling the state transitions of DBN.

$$P(Y=0 \mid X) = q_0 \prod_{k=0}^{n} q_k^{X_k}, X_k \in \{0, 1\}.$$

Wherein if Y, Y∈{0, 1} is the output and X=(X$_1$, X$_2$ ... X$_n$), X$_k$∈{0, 1} is the input then the NoisyOR CPD is parameterized by n+1 parameters, (q$_0$, q$_1$, q$_2$ ... q$_n$)≤q$_i$≤1.

In the preferred embodiment, the NoisyOR CPD is a stochastic perturbation of the deterministic-OR function.

When $q_0=1$ and $q_k=0$, $\forall k>0$ the CPD captures a noiseless OR function. Further, when one or more of the $q_{ks}$ are non-zero, the CPD allows for a non-zero chance of the output becoming 0 in spite of one or more high inputs. In comparison, an existing CPD which models state transitions assumes that link congestion at the current instant is a function of only the number of congested (or saturated) neighbors at the previous instant. Hence, concisely it is referred to as the SatPat CPD. Therefore, the SatPat CPD is oblivious to the identity of its neighbors and hence it can be very restrictive.

At the last step 110, the process predicts travel time of the vehicle on one or more routes within the network of arterial roads using a real time information of trajectories of the one or more probe vehicles and the one or more learnt parameters of the data driven probabilistic model.

Figure 3:
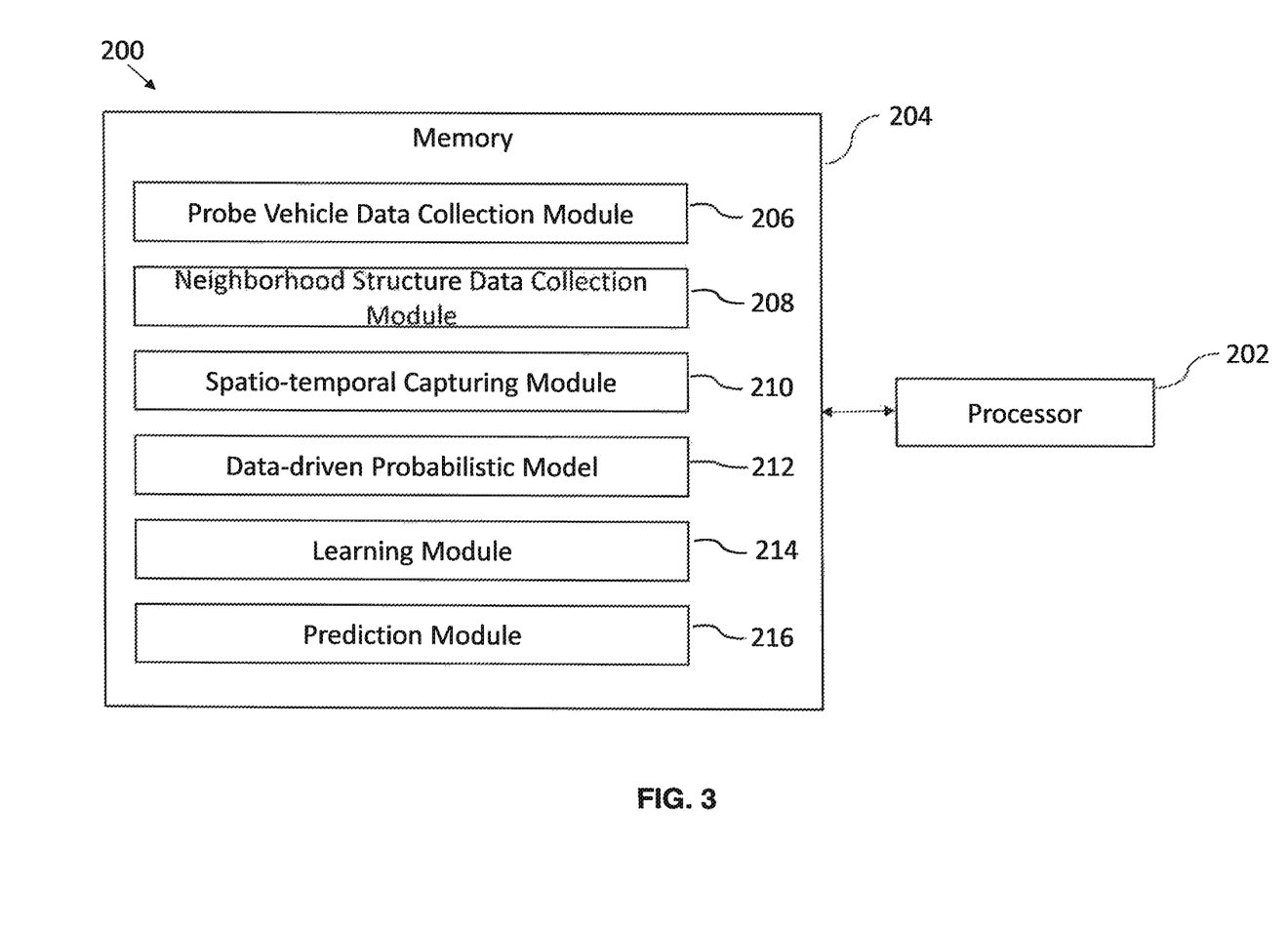
FIG. 3 illustrates a system for predicting travel time of a vehicle on one or more routes within arterial roads according to an embodiment of the present disclosure.

Referring FIG. 3, a system 200 for predicting travel time of a vehicle on one or more routes within arterial roads. The system 200 comprising a processor 202, a memory 204 communicatively coupled to the processor 202 a plurality of probe vehicle data collection module 206, a neighborhood structure data collection module 208, a spatio-temporal capturing module 210, a data-driven probabilistic model 212, a learning module 214, and a prediction module 216.

In the preferred embodiment of the system 200 the processor 202 is configured to execute one or more steps such as collecting information of positions of one or more probe vehicles in a periodic fashion using GPS technology using a plurality of probe vehicle data collection module 206. The sequence of links traversed between successive position measurements is computed using a shortest path algorithm (for instance) on an equivalent graph. Each node in this graph corresponds to a link in the network of arterial roads, a directed edge in this graph is from an upstream link to a downstream neighbor. The neighborhood structure needed here is provided by the neighborhood structure data collection module 208.

Further, the neighborhood structure data collection module 208 of the system is configured to collect information of neighborhood structure for each link of the network of the arterial roads. The collected information of neighborhood structure for a link of the network includes its downstream links and upstream links.

In the preferred embodiment, the spatio-temporal capturing module 210 of the system 200 is configured to capture the spatio-temporal dependencies between each link of the network of the arterial road and all its neighbors using a NoisyOR conditional probability distribution. The ith neighbor of a link influences the congestion at the given link via an independent parameter $p^i$ $(1-q^i)$. Given that the ith neighbor is the only congested neighbor of a given link at the previous time instant, the parameter $p^i$ governs the chance of congestion at the given link at the current time instant. Hence the NoisyOR CPD neatly captures influence of neighbouring links in an independent and link dependent fashion. When two or more links are simultaneously congested at the previous time instant, they independently influence the congestion probability of the target link at the current time instant as evident from the NoisyOR definition equation. Further, as the number of uncongested neighbors increase, it is easy to see that the chance of no congestion decreases (from the NoisyOR equation). Hence the proposed CPD also captures an important intuition that the chance of congestion increases with the number of congested neighbors, an aspect not strictly captured by existing methods.

Figure 4:
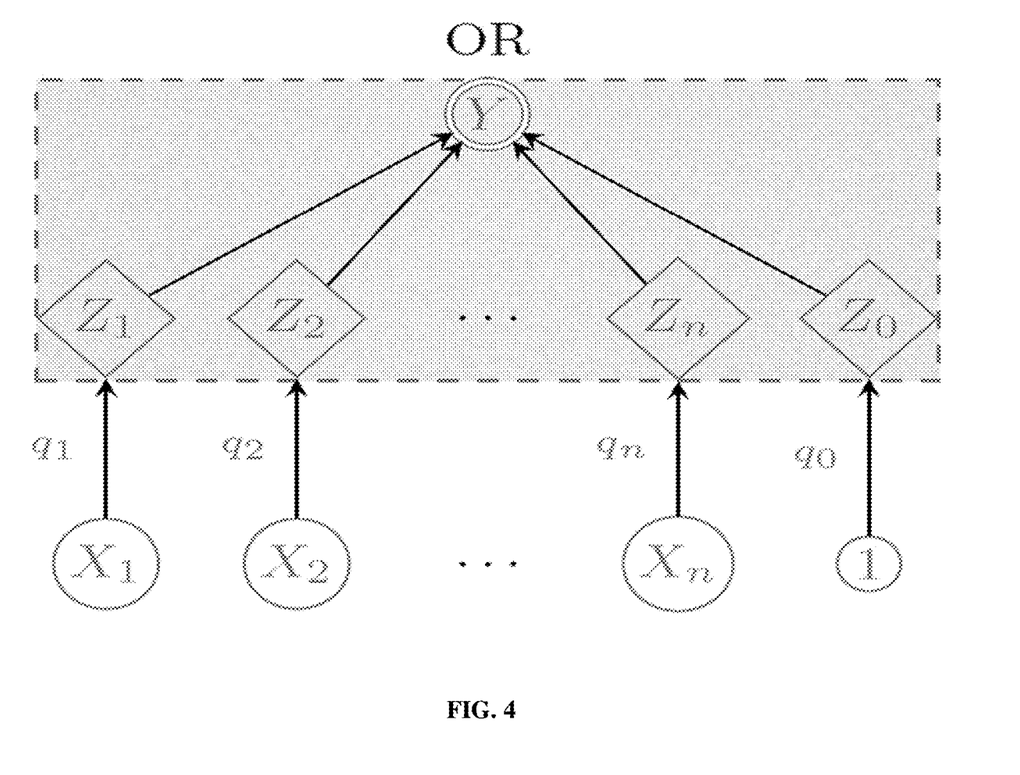
FIG. 4 is a schematic diagram for proposed model for the DBN's transition conditional probability distribution according to an embodiment of the present disclosure.
Figure 5:
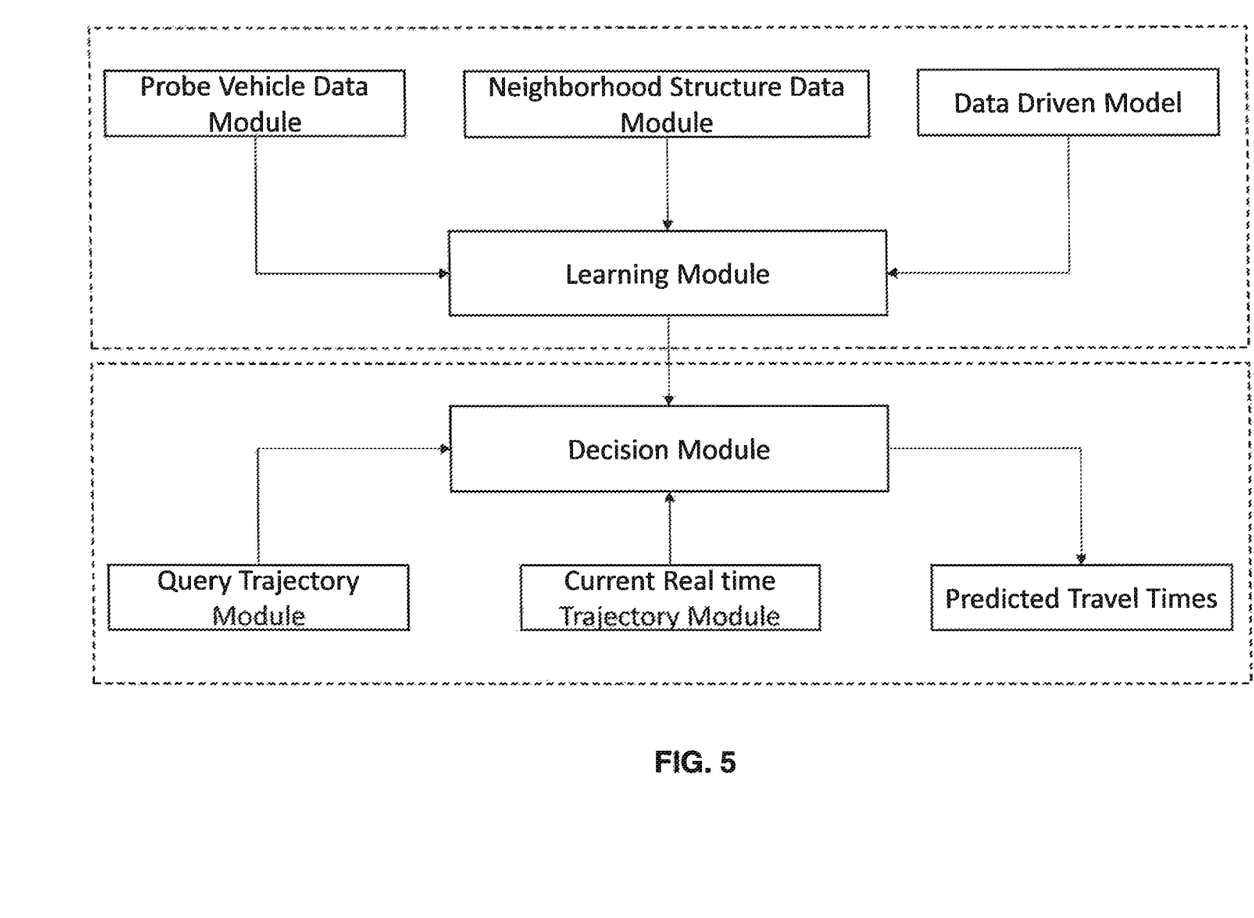
FIG. 5 is a schematic diagram for predicting travel time of a vehicle on one or more routes within arterial roads according to an embodiment of the present disclosure.

In an embodiment, the system uses an alternative representation of the NoisyOR CPD which is extremely crucial for making efficient learning feasible. From this alternate perspective, the NoisyOR model can be viewed as shown in FIG. 4. On each input line $x_k$ there is a stochastic line failure function, whose output is $z_k$. The deterministic NoisyOR finally acts on the $z_k$s. When the input $x_k$ is zero, the line output $z_k$ is also zero. When the input is high, with the inhibitor probability $q_k$, line failure happens in other words, $z_k$ is zero. The term $q_0$ is essentially like a bias which controls the chance of the output being 1 in spite of all inputs being off. Therefore, it is easy to see that the conditional probability of the output given the input as per the CPD in FIG. 4 is same as that given in NoisyOR equation. Under the NoisyOR CPD, a typical factor which models the hidden state transitions can be expressed as $$A(\eta^{i,t-1}, \overline{\eta}^{i,t-1}, s^{i,t})$$

Where, $\eta^{i,t-1}=[\overline{\eta}_0^{i,t-1}, \overline{\eta}_1^{i,t-1}, \ldots, \overline{\eta}_{|\pi_1|}^{i,t-1}]$ with $\overline{\eta}_j^{i,t-1}$ representing the actual state of i's neighbor j at time t−1. Similarly, $\overline{\eta}^{i,t-1}=[\overline{\eta}_0^{i,t-1}, \overline{\eta}_1^{i,t-1}, \ldots, \overline{\eta}_{|\pi_1|}^{i,t-1}]$ with $\overline{\eta}_j^{i,t-1}$ denoting the additional new random variable introduced via the representation of FIG. 4.

Further the system 200 learns the parameters of the data-driven probabilistic model 212 from the collected information of trajectories of the one or more probe vehicle traversed within the network of the arterial roads using expectation maximization method using the learning module 214. The learning procedure is an iterative process called an Expectation Maximization (EM) algorithm which involves two steps at each iteration. The expectation step (E-step) involves computing a suitable Expected Sufficient Statistic (ESS) given the current set of parameters. The ESS computation is accomplished in an approximate fashion using a specific stochastic sampling based technique called particle filtering. As the particles are grown, the current underlying NoisyOR transition probability structure is utilized to grow the particles.

Further, the Maximization step (M-step) involves computing the next set of improved parameters by maximizing a certain function called a Q-function. The parameters are improved because under any EM-based algorithm the data likelihood under the new parameters necessarily increases and the algorithm ultimately tries to learn a set of parameters that maximize the data likelihood. The enhanced parameters in the M-step can be computed in closed form under the NoisyOR CPD as shown below, from the ESS computed in the previous E-step. The closed form computation is feasible because NoisyOR conditional probability distribution belongs to the Exponential family of distributions.

$$q_{i,j}^{l+1} \propto \sum_{t=2}^{T} P(\eta_j^{i,t-1}=1, \overline{\eta}_j^{i,t-1}=0 \mid y, \theta^l)$$

$$q_{i,j}^{l+1} \propto \sum_{t=2}^{T} P(\eta_j^{i,t-1}=1, \overline{\eta}_j^{i,t-1}=1 \mid y, \theta^l)$$

where the proportionality constants are same. It is to be noted that $q_{i,j}$ and $p_{i,j}$ add up to 1. 'y' in the above equation refers to the set of observed trajectories of all probe vehicles in the training data. $\Theta^l$ refers to the set of all parameters after the $l^{th}$ EM iteration.

In the M-step update, the Q-fn for the DBN model involves a sum of a two major terms. One is exclusively a function of the observation parameter ($\mu$, $\sigma$) and the other only that of the transition parameters ($q^i$, $p^i$) for NoisyOR. Hence the joint maximization of the transition and observation parameters gets decoupled. The second term is obtained by taking log and expectation with respect to p(s|y, θ$^1$) of the NoisyOR CPD factors for each of the links. A closed form maximization is feasible for the second term of the Q-fn. A detailed derivation leads to the above updates of the transition parameters. The first term maximization can be achieved using existing techniques described in the SatPat method.

In the preferred embodiment, the prediction module 216 of the system 200 predicts travel time of the vehicle on one or more routes within the network of the arterial roads. The prediction module 216 collects the real time information of trajectories of one or more probe vehicles and the one or more learnt parameters of the data driven probabilistic model.

Referring FIG. 3, a schematic diagram to predict travel time of a vehicle on one or more routes within arterial roads. Predicting travel times of vehicles within arterial roads is a very useful and tangible quantity of interest in the context of intelligent transportation systems. The system receives data inputs from probe vehicles data module. A NoisyOR conditional probability distribution in conjunction with a temporal Bayesian network is used to learn hidden state transitions of the various roads. The learnt parameters helps us understand the varying degrees of influence a given road experiences from its neighbors.

In one embodiment, as an example, a synthetic data generator is fed with a road network containing certain links along with their lengths and a neighborhood structure as shown in FIG. 3. Based on this neighborhood structure the system feeds the generator a transition probability structure governing the congestion state transitions of individual links from time t to time t+1. The conditional travel times for each link i and state s, is assumed to be normally distributed with appropriate parameters $\mu^{i,s}$ and $\sigma^{i,s}$. The $\mu^{i,0}$ and $\mu^{i,1}$ capture the average travel times experienced by commuters during congestion and non-congestion due to intersections or traffic lights. The a parameter captures the continuum of congestion levels actually possible. The link states are assumed to make transition at a time scale approximately equal to Δ. In addition, the paths and vehicles are so chosen that there is sufficient coverage of all the links across space and time. The link states that are stochastically sampled with time as per prefixed transition probability structure. Given the state of all the links at a particular time epoch, the idea of probe vehicle trajectory generation is as follows. If a vehicle is at a position $x^s$ at the start of a time epoch of Δ, then the idea is to exhaust these Δ units of time along the (prefixed) path of the vehicle and arrive at an appropriated end position based on the conditional normal travel times at each link.

Figure 6:
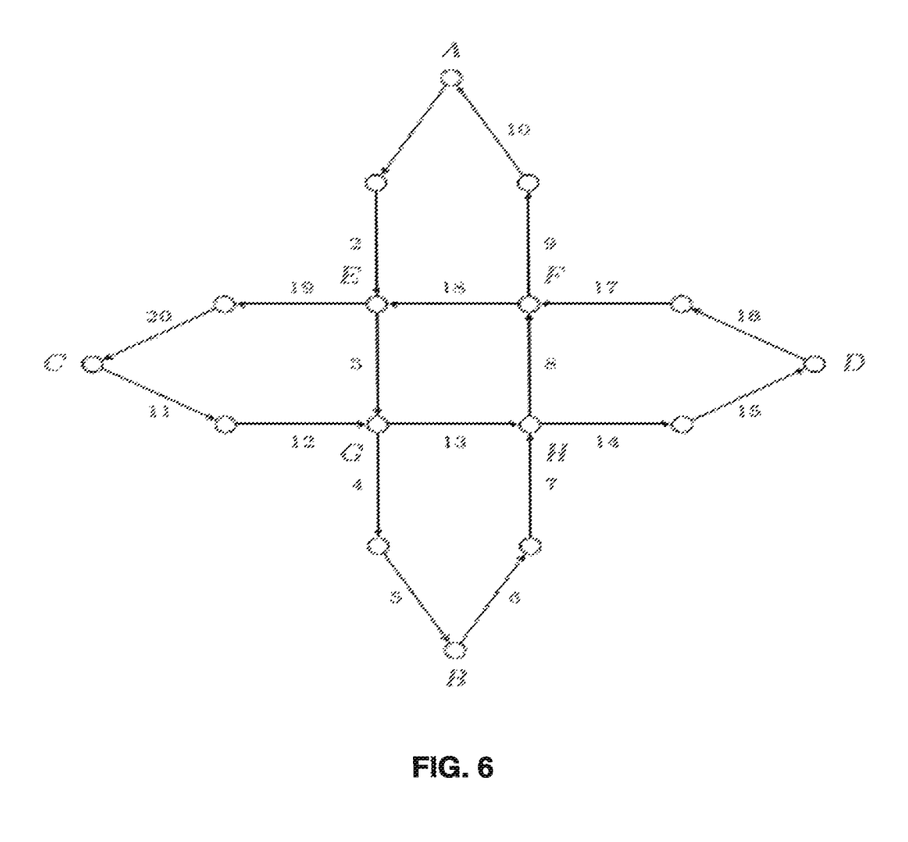
FIG. 6 is a schematic diagram of a network structure consists of 20 links according to an embodiment of the present disclosure.

Referring FIG. 6, as an example, a short-lived congestion is embedded herein which can randomly originate at either link 1, 6, 11 or 16. Once congestion starts at link 1, it moves downstream to link 2 with probability 1 at the next time step and this process continues unidirectionally till link 5. A similar congestion pattern which moves downstream one link at a time at every subsequent time step is embedded starting from link 6, 11 and 16. Congestion doesn't persist in the same link into the next time step in any of the links these are short-lived congestions. Such short-lived congestion happens in real-world when a wave of vehicles traverse the links. It is to be noted that the short-lived congestion can be elegantly modelled using a NoisyOR based data generator.

Figure 7A:
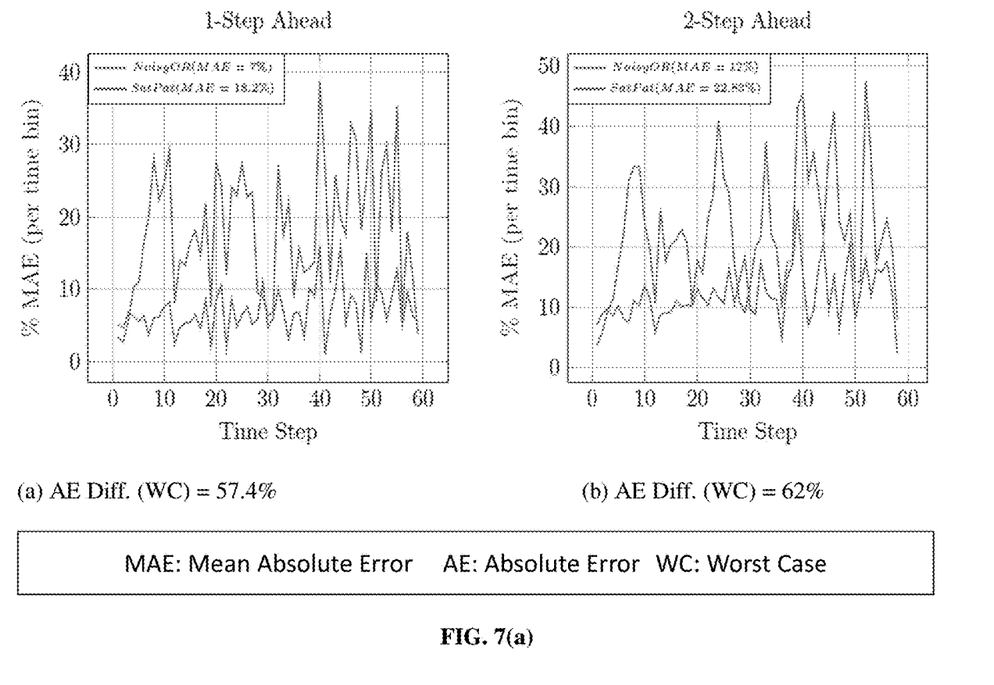
FIGS. 7(a) and 7(b) is a schematic diagram of a time-series of i-step ahead prediction errors for varying 'i' according to an embodiment of the present disclosure.
Figure 7B:
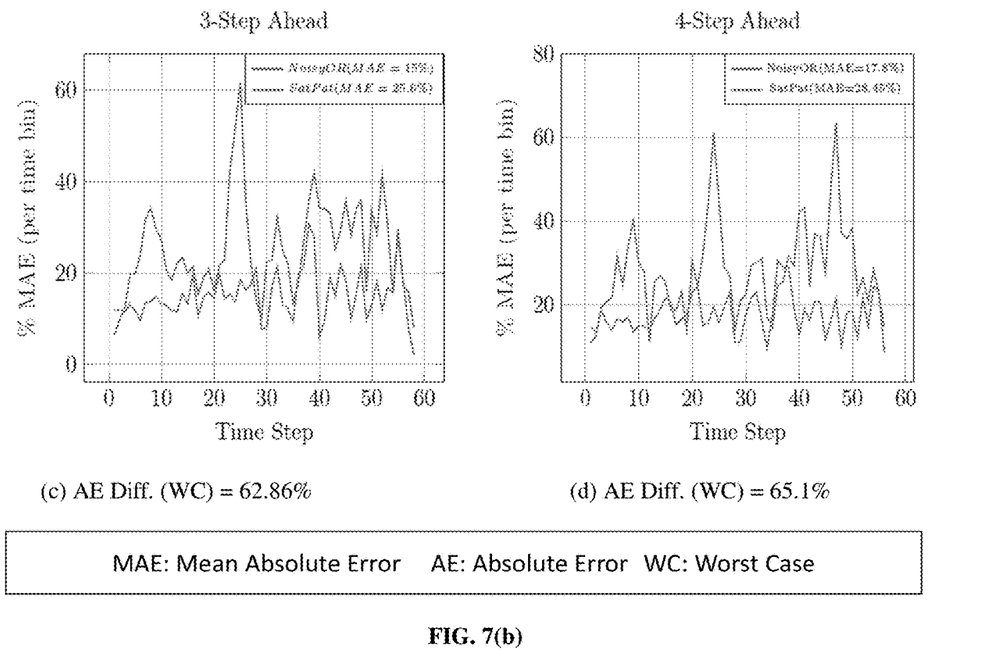

Referring FIGS. 7 (*a*) and (*b*), as an example, wherein it demonstrates the prediction error difference between the proposed (NoisyOR) and existing (SatPat) methods for short trips with true trip duration of Δ. It would be appreciated that it gradually increases the start time of the trip in steps of Δ. Given a test sequence (not used for training) of vehicular trajectory observations on a new day up to a time t, the system predicts the travel time of test trajectories of all 16 vehicles in some future time bin (t+i), where i>0. For ease of present-ability, the system averages the absolute prediction errors across all 16 vehicles at a particular time bin. One can now compute a time-series of i-step prediction errors for varying i. Further, it shows the comparative error time series for i varying from 1 to 5. The plots clearly demonstrate that the prediction error of proposed NoisyOR method outperforms the existing SatPat method under the embedded congestion pattern. As intuitively expected, the average prediction errors increase with i for both methods. Recall that i refers to the number of steps ahead for the start of the test trip from the currently observed latest trajectories. From all these experiments, it would be appreciated that the method improves prediction accuracy by about 10-12% in the average case and by about 50-60% in the worst case.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for predicting travel time of a vehicle on one or more routes within arterial roads. The process collects historical information of one or more probe vehicle positions using GPS technology in a periodic fashion and the sequence of links traversed between successive position measurements via map-matching or shortest-path techniques. Further, the process collects information of neighborhood structure for each link within the arterial roads network. A NoisyOR conditional probability distribution functions is used to capture the spatio-temporal dependencies between each link of the arterial network and its neighbors. It learns the parameters of a data driven probabilistic model from collected historical information of probe vehicle trajectories traversed within the arterial roads network using expectation maximization method and finally the process predicts travel time of the vehicle (using particle filtering) on one or more routes within the arterial roads using the current real time information of the trajectories of the one or more probe vehicles that have been recorded from the arterial roads network using GPS technology sensing and the one or more learnt parameters of data driven probabilistic model.

The embodiments of present disclosure herein addresses unresolved problem to predict travel times of a vehicle if the road condition seen by the vehicle is different from the average conditions. While the existing state-of-art is reasonable in many instances in predicting travel times but they may not be helpful for all vehicles. For instance, in certain countries there are vehicles larger than cars and they are restricted to specific lanes with their own different speed limit. Hence the travel times and congestions seen by such vehicles could be different from the values that are predicted from the existing state of art applications.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented method for predicting travel time of a vehicle on one or more routes within a network of the arterial roads, the computer implemented method comprising:

collecting, by a processor, information of trajectories of one or more probe vehicles in a periodic fashion using GPS technology over a period of time, wherein the one or more probe vehicles are plying around the network of the arterial roads;

collecting, by the processor, information of neighborhood structure for each link of one or more links of the network of the arterial roads, wherein the information of neighborhood structure for the link includes information on downstream links and upstream links of route, wherein the information of neighborhood structure includes a traversal time of the one or more probe vehicles in each link of one or more links of the network of the arterial roads, and wherein the each link of the network is assumed to be in any one of a congested state or a uncongested state;

capturing, by the processor, spatio-temporal dependencies between each link of the network of the arterial roads using a NoisyOR conditional probability distribution, wherein the spatio-temporal dependencies includes a congestion correlation based on the collected information of neighborhood structure for each link of the network of the arterial roads;

learning, by the processor, one or more parameters of a data driven probabilistic model from the collected information of the trajectories of the one or more probe vehicles traversed within the network of the arterial roads and captured spatio-temporal dependencies between each link of the network of the arterial roads using an expectation maximization method; and predicting, by the processor, travel time of the vehicle on the one or more routes within the network of the arterial roads using a real time information of trajectories of the one or more probe vehicles and the one or more learnt parameters of the data driven probabilistic model.

2. The method claimed in claim 1, wherein the one or more probe vehicles are enabled with GPS technology.

3. The method claimed in claim 1, wherein the one or more probe vehicles include one or more regular cabs from a cab service provider and one or more regular commuters having dedicated GPS technology sensing in vehicles which are moved around the network of the arterial roads periodically.

4. The method claimed in claim 1, further comprising: collecting information of sequence of one or more links traversed between successive positions of the one or more probe vehicles.

5. The method claimed in claim 1, wherein a dynamic Bayesian network (DBN) model is used as the data driven probabilistic model for accurate prediction.

6. The method claimed in claim 1, wherein the NoisyOR condition probability distribution is imposed on transition structure of the DBN to capture the spatio-temporal dependencies.

7. The method claimed in claim 1, wherein the expectation maximization method is used to estimate transition parameters of arterial traffic DBN model.

8. A system for predicting travel time of a vehicle on one or more routes within a network of the arterial roads, the system comprising:
   a memory with a set of instructions;
   a processor communicatively coupled with the memory;
   a plurality of probe vehicle data collection module configured to collect information of trajectories of one or more probe vehicles in a periodic fashion using GPS technology over a period of time, wherein the one or more probe vehicles are plying around the network of the arterial roads;
   a neighborhood structure data collection module configured to collect information of neighborhood structure for each link of one or more links of the network of the arterial roads, wherein the information of neighborhood structure for the link includes downstream links and upstream links, wherein the information of neighborhood structure includes a traversal time of the one or more probe vehicles in each link of one or more links of the network of the arterial roads, and wherein the each link of the network is assumed to be in any one of a congested state or a uncongested state;
   a spatio-temporal capturing module configured to capture spatio-temporal dependencies between the one or more links of the network of the arterial roads based on the neighborhood structure using a NoisyOR conditional probability distribution, wherein the spatio-temporal dependencies includes a congestion correlation based on the collected information of neighborhood structure for each link of the network of the arterial roads;
   a learning module configured to learn one or more parameters of a data driven probabilistic model from the collected information of the trajectories of the one or more probe vehicles traversed within the network of the arterial roads and captured spatio-temporal dependencies between each link of the network of the arterial roads using expectation maximization method; and
   a prediction module configured to predict travel time of the vehicle on the one or more routes within the network of the arterial roads using a real time information of trajectories of the one or more probe vehicles and the one or more learnt parameters of the data driven probabilistic model.

9. The system claimed in claim 8, wherein the plurality of probe vehicle data collection module is configured to collect real time information of the trajectories of the one or more probe vehicles.

10. The system claimed in claim 8, wherein the plurality of probe vehicles data collection module computes the sequence of one or more links traversed between successive positions of the one or more probe vehicles using map-matching or shortest-path techniques.

11. The system claimed in claim 8, wherein the one or more vehicles are enabled with GPS technology.

12. The system claimed in claim 8, wherein the one or more probe vehicles include one or more regular cabs from a cab service provider and one or more regular commuters having dedicated GPS technology sensing in vehicles which are moved around the network of the arterial roads periodically.

13. The system claimed in claim 8, wherein a dynamic Bayesian network (DBN) model is used as the data driven probabilistic model for accurate prediction.

14. The system claimed in claim 8, wherein the NoisyOR condition probability distribution is imposed on the transition structure of the DBN to capture spatio-temporal dependencies.

15. The system claimed in claim 8, wherein an expectation maximization method is used to estimate the transition parameters of the arterial traffic DBN model.

* * * * *